United States Patent [19]
Kilgore et al.

[11] 3,831,667
[45] Aug. 27, 1974

[54] COMBINATION WET AND DRY COOLING SYSTEM FOR A STEAM TURBINE

[75] Inventors: Lee A. Kilgore, Export; Kenneth A. Oleson, Pittsburgh, both of Pa.

[73] Assignee: Westinghouse Electric Corporation, Pittsburgh, Pa.

[22] Filed: Feb. 4, 1971

[21] Appl. No.: 112,659

[52] U.S. Cl.............. 165/96, 60/95 R, 60/96, 165/110, 165/122, 165/125, 261/DIG. 11, 261/159
[51] Int. Cl......... F28b 1/02, F28b 3/04, F28b 5/00
[58] Field of Search...... 62/304, 314, 261; 165/111, 165/112, 107, 110, 113, 122, 124, 125, 96, 261, 159; 261/DIG. 11, 151, 152, 158, 109, 138; 60/95, 96

[56] References Cited
UNITED STATES PATENTS

| | | | |
|---|---|---|---|
| 3,115,534 | 12/1963 | Bottner | 261/DIG. 11 |
| 3,117,170 | 1/1964 | Mart et al. | 261/DIG. 11 |
| 3,169,575 | 2/1965 | Engalitcheff, Jr. et al. | 261/151 X |
| 3,423,078 | 1/1969 | May | 62/310 X |
| 3,635,042 | 1/1972 | Spangemacher | 62/314 X |

FOREIGN PATENTS OR APPLICATIONS

| | | | |
|---|---|---|---|
| 937,380 | 9/1963 | Great Britain | 261/DIG. 11 |
| 1,812,111 | 6/1970 | Germany | 62/304 |

OTHER PUBLICATIONS

Buss, Jr., "How To Control Fog," Power, 1/68, pgs. 72 and 73.
EPA (John P. Rossie, et al.), Research On Dry-Type Cooling Towers, U.S. Govt. Printing Office, Washington, D.C. (16130EES 11/70), pgs. 13 to 29, cover page.

Primary Examiner—Albert W. Davis, Jr.
Attorney, Agent, or Firm—F. J. Baehr, Jr.

[57] ABSTRACT

A combination wet-dry cooling system for an axial flow steam turbine having a portion of the exhaust steam from the turbine condensed by cooling water circulating through a condenser and through a wet cooling tower, and having another portion of the exhaust steam condensed by liquid coolant circulated in a finned tube heat exchanger, wherein the heat from the liquid coolant is transferred to the air, and the liquid coolant is passed through the tubes extending through the condenser, or the liquid coolant is sprayed directly into the condenser to provide mixing condensing, thus providing a cooling system, which eliminates the objectionable plume associated with wet cooling towers and which is smaller than dry cooling towers.

1 Claim, 4 Drawing Figures

WITNESSES
Theodore F. Wrobel
Fred J. Baehr Jr.

INVENTORS
Lee A. Kilgore and
Kenneth A. Oleson

COMBINATION WET AND DRY COOLING SYSTEM FOR A STEAM TURBINE

BACKGROUND OF THE INVENTION

This invention relates to a cooling system for an axial flow steam turbine and more particularly to a wet-dry cooling system.

In steam turbogenerator power plants, heat from the exhaust steam of the turbine has typically been transferred to cooling water from a river, lake or some other natural water supply. However, with the increased number of power plants, the number of natural sources of cooling water has decreased necessitating the use of wet cooling towers, where the supply of natural cooling water is insufficient. The plume from these wet or evaporative cooling towers has become both a nuisance and a problem even though the plume is essentially pure water. The plume is less dense than ambient air, because it is at an elevated temperature, thus it may rise and mix with the stack effluent from fossil fuel boilers to produce sulfurous and other corrosive and potent acids. The vapor plume may also cause local fogging and icing conditions on nearby roadways in winter months. The wet cooling towers also require large quantities of makeup water, since they are cooled by evaporation.

Dry cooling towers, wherein the cooling water is cooled by transferring heat to the air, require extremely large heat transfer surfaces. For example, dry cooling towers may be large enough to house a complete power plant within the cooling tower, see U.S. Pat. No. 3,150,267 for a power plant disposed within a dry cooling tower. Utilizing dry cooling towers will also require redesign of the turbines presently being used as dry cooling towers provide higher exhaust temperature and pressure, which must be taken into account when designing a turbine.

Direct condensing, wherein the exhaust steam is condensed by coming in direct contact with air through a shell and tube heat exchanger, has been combined with jet condensing, wherein condensate is cooled in a finned tube heat exchanger and the cool condensate is sprayed into the condenser, as shown in U.S. Pat. No. 3,423,078. However, the heat transfer surface area of the direct condenser, one side of which must be maintained under vacuum, is large, thus increasing the possibility of air leakage into the condenser. Air leakage into the condenser increases the back pressure on the turbine and reduces its efficiency.

SUMMARY OF THE INVENTION

In general, a combination wet-dry condensing system for exhaust steam of an axial flow steam turbine made in accordance with this invention comprises a condenser having two heat exchange portions, each portion being effective to condense exhaust steam by transferring heat to a liquid coolant associated therewith, a wet cooling tower for cooling one liquid coolant associated with the one heat exchange portion of the condenser by contacting the one liquid with air to cause evaporative cooling thereof, and a liquid to air heat exchanger for cooling the other liquid coolant associated with the other heat exchange portion of the condenser. The wet cooling tower and the liquid to air heat exchanger are disposed to allow series air flow therethrough. A first circulating pump circulates the one coolant from the cooling tower through the one heat exchange portion of the condenser and a second circulating pump circulates the other liquid coolant through the liquid to air heat exchanger.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
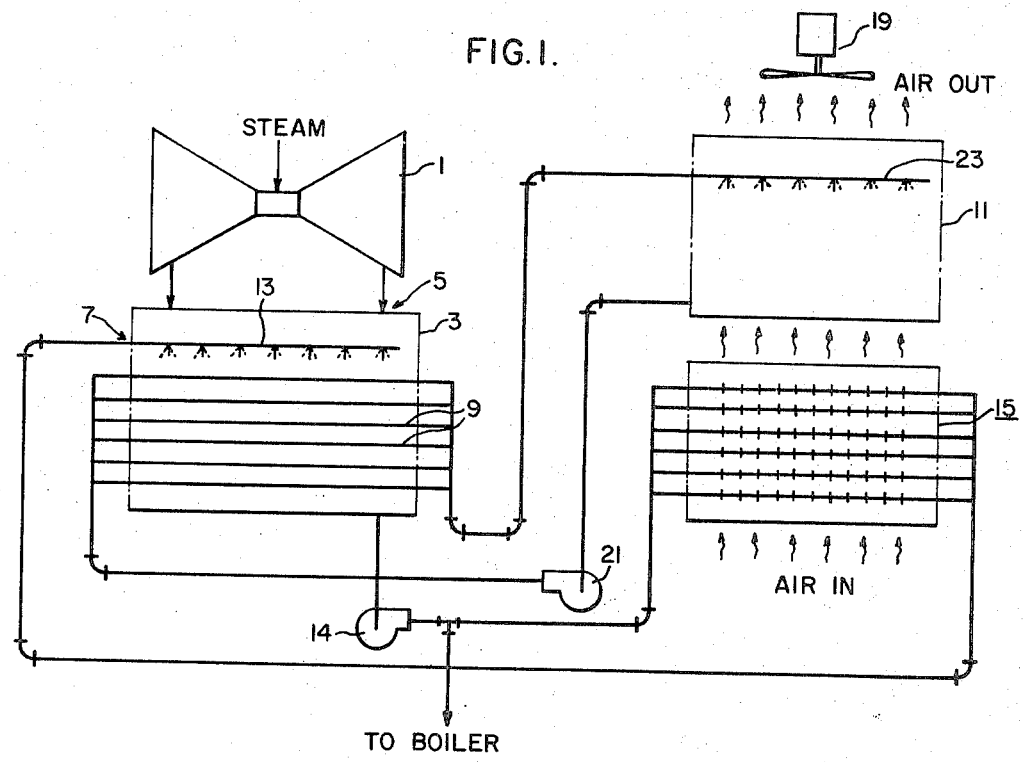
FIG. 1 is a schematic diagram of a wet-dry condensing system made in accordance with this invention.

Referring now to the drawings in detail, FIG. 1 shows a schematic diagram of a wet-dry cooling system made in accordance with this invention. Steam enters a double flow low pressure portion of an axial flow steam turbine 1, and flows to a heat exchanger or condenser 3 having two separate heat exchange portions 5 and 7. Each heat exchange portion of the condenser will effectively condense the exhaust steam from the turbine by transferring the heat of vaporization of the steam to a separate liquid coolant associated with each heat exchange portion of the condenser.

One heat exchange portion 5 of the condenser 3 comprises a plurality of tubes 9 extending therethrough. The tubes 9 are so arranged with respect to the condenser 3 that one liquid coolant, generally water, flows through the tubes 9 and through a wet cooling tower 11, which cools the one liquid coolant by contacting the one liquid coolant directly with air to cause evaporative cooling thereof.

The other heat exchange portion of the condenser comprises a spray distributor 13, which atomizes the other liquid coolant, in this case condensate, and distributes it over the entire volume of the other heat exchange portion 7 of the condenser 3 to provide the condensate with a large surface area so that it comes in direct contact with the exhaust steam, absorbs the heat of vaporization from the exhaust steam and condenses the exhaust steam. A portion of the condensate from the condenser is pumped to a boiler (not shown) and the remainder is circulated by a liquid propelling pump 14 through a liquid to air finned tube or extended surface heat exchanger 15 which cools the condensate by transferring heat to the air before the condensate is returned to the spray distributor 13. The air does not contact the condensate and the air side of the finned tube heat exchanger is dry to prevent fouling and reduction in the heat transfer rate of the extended surfaces caused by algae or fungi which tend to grow on such surfaces when they are constantly wetted and in contact with the air.

The wet cooling tower 11 has a fan 19 for drawing cooling air therethrough. The finned tube heat exchanger 15 is disposed upstream of the wet cooling tower 11 so that air being drawn into the wet cooling tower first passes through the finned tube heat exchanger removing heat from the condensate flowing through the finned tube heat exchanger and adding heat to the air to lower the relative humidity of the air before it enters the wet cooling tower 11.

A liquid propelling pump 21 pumps the one coolant, water, from the wet cooling tower 11 through the condenser tubes 9, where it picks up heat from the exhaust steam, and then to the spray nozzles 23 dispersed in the wet cooling tower 11. The spray from the nozzles 23 contacts the air to promote evaporative cooling.

The air having been heated by the finned tube heat exchanger 15 before entering the wet cooling tower 11 is warm and has a low relative humidity compared to ambient air, so that even after contacting the water and evaporative cooling, the leaving air is not saturated. Thus, if there is linear cooling and dispersion of the exhaust air from the cooling tower 11 a visible plume will not occur. If however, on the other hand, the exhaust air from the cooling tower 11 were to cool at constant humidity to saturation a plume would occur, however, the plume would be substantially less dense than plumes from conventional wet cooling towers and would disperse rapidly. The ratio of the heat transferred in the wet cooling tower 11 relative to the heat transferred in the finned tube heat exchanger 15 may be varied to reduce or eliminate any visible plume at any actual set of operating conditions.

Figure 2:
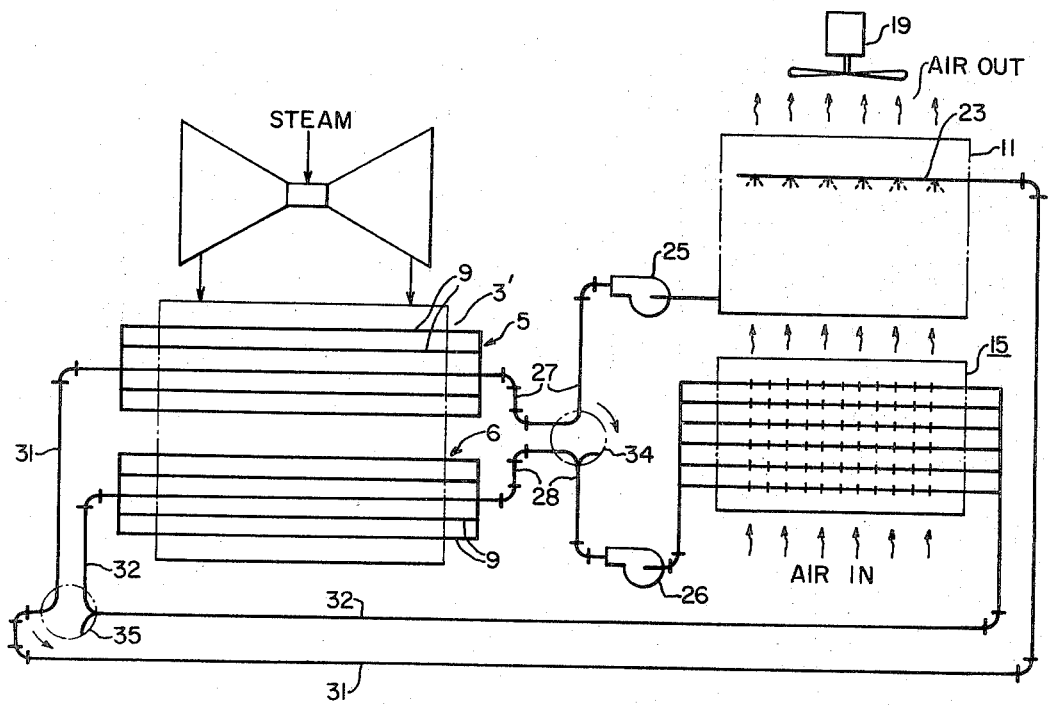
FIG. 2 is a schematic diagram of a modified wet-dry condensing system.

The schematic diagram in FIG. 2 shows an alternate wet-dry cooling system. As in FIG. 1 steam enters a double flow low pressure portion of an axial flow steam turbine 1 and the exhaust steam from the turbine flows to a heat exchanger or condenser 3' having two separate heat exchange portions 5 and 6. Each heat exchange portion of the condenser 3' will effectively condense the exhaust steam from the turbine by transferring the heat of vaporization of the exhaust steam to a liquid coolant passing through the respective heat exchange portion of the condenser. Each heat exchange portion as shown in FIG. 2 comprises a plurality of tubes 9 extending therethrough. The tubes 9 are so arranged with respect to the condenser that the liquid coolants flow through the tubes.

One liquid coolant is circulated through one heat exchange portion 5 of the condenser 3' and through the wet cooling tower 11 by a liquid propelling pump 25 and another liquid coolant is circulated through the other heat exchange portion 6 of the condenser 3' and also through the finned tube heat exchanger 15 by a liquid propelling pump 26.

Influent conduits 27 and 28 direct the coolant liquid from the pumps 25 and 26 to the heat exchange portions 5 and 6 of the condenser 3', respectively.

Effluent conduits 31 and 32 direct the liquid coolant from the heat exchange portions 5 and 6 of the condenser 3' to the wet cooling tower 11 and the finned tube heat exchanger 15, respectively.

A flow control valve 34, associated with the influent conduits 27 and 28, is operable to allow influent liquid flowing through the influent conduits to flow to the respective heat exchange portions 5 and 6 of the condenser 3' when set in one position as shown in FIG. 2. The flow control valve 34 is also operable to shut off the influent liquid flowing from the cooling tower and to allow influent liquid from the finned tube heat exchanger to flow through both heat exchange portions 5 and 6 of the condenser 3', when set in another position.

A flow control valve 35 is associated with the effluent conduits 31 and 32 and is operable to allow effluent coolant to flow from the respective heat exchange portions 5 and 6 of the condenser 3' through the effluent conduits 31 and 32, respectively, and to the cooling tower 11 and the finned tube heat exchanger 15 when set in one position, as shown in FIG. 2. The flow control valve 35 is also operable to shut off the effluent conduit 31 leading to the cooling tower and to allow effluent coolant from both heat exchange portions 5 and 6 of the condenser 3' to circulate through the finned tube heat exchanger 15, when set in another position.

As shown in FIG. 2 all of the liquid coolant may be channeled through the finned tube heat exchanger 15 by operating the flow control valves 34 and 35. This would be particularly advantageous during the winter months, when the ambient air temperature is very low, as it would eliminate freezing, which normally occurs in wet cooling towers during the winter months. Transferring all the heat from the exhaust steam of the turbine to the finned tube heat exchanger 15 will normally provide sufficiently high inlet temperatures under full load operation to prevent freezing of the liquid coolant, however, under partial load or no load conditions it may be desirable to provide an additive which lowers the freezing point of the liquid coolant. Since the system is closed, other liquid coolants besides water could also be used.

Figure 3:
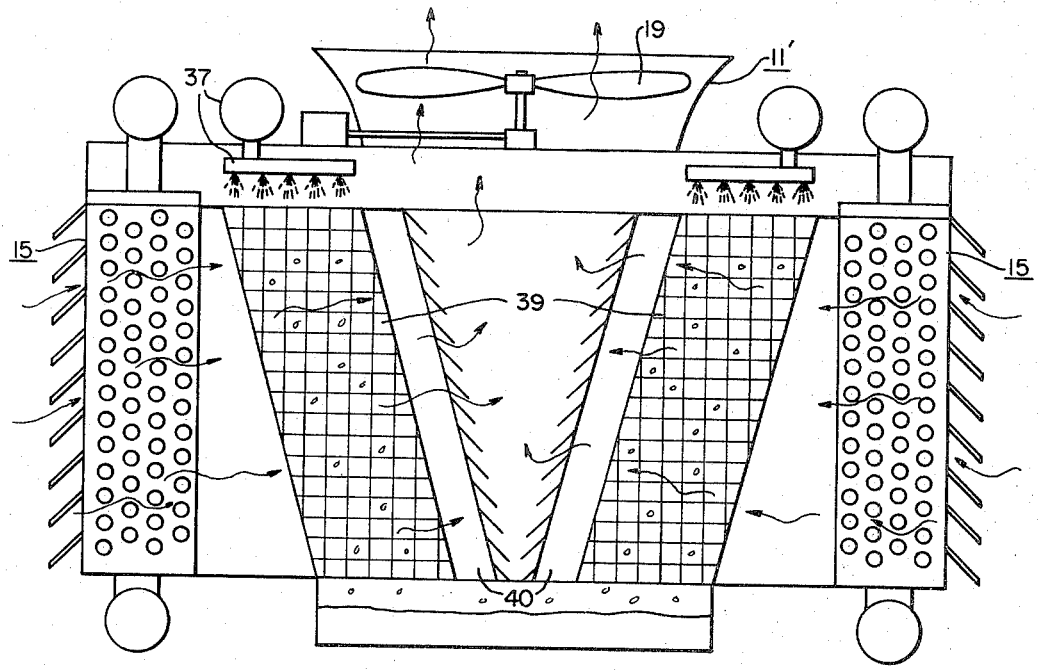
FIG. 3 is a schematic diagram of a wet-dry cooling tower made in accordance with this invention.

FIG. 3 shows the flow diagram of a combination wet-dry cooling tower 11' that may be used in a wet-dry condensing system made in accordance with this invention. While the schematic diagrams shown in FIGS. 1 and 2 only show a single cooling tower the system lends itself to the use of a plurality of cooling towers, the number and size depending on the size of the turbine and the ambient air conditions. Generally, each cooling tower comprises a warm water distributor 37, a packed portion 39, packed with splash-type packing, such as Raschig rings or saddles, for increasing the surface area of the water as it progresses from the top to the bottom of the cooling tower, a mist eliminator 40 for removing large water droplets carried by the air stream a finned tube or extended surface liquid to air heat exchanger 15 and a fan 19 to draw air across the finned tube heat exchanger 15 and through the packing 39. The finned tube heat exchanger 15 is disposed on the upstream air side of the packing 39 so as not to be splashed with water, as the water tends to deposit solids and promote the growth of algae and fungi on the fins causing fouling and thus reducing the overall heat transfer rate of the finned tube heat exchanger 15, and increase the pressure drop across the finned tube heat exchanger.

Figure 4:
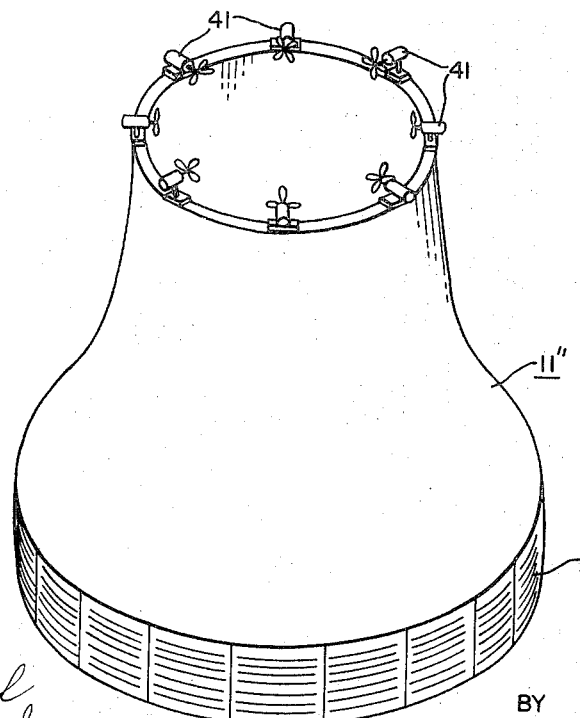
FIG. 4 is a perspective view of a modified wet-dry cooling tower.

The wet-dry cooling tower 11" shown in FIG. 4 is sufficiently tall to induce natural draft and the finned tubes heat exchanger 15 is disposed to form a peripheral wall adjacent the base of the cooling tower. The packing and water distributors within the tower are disposed to prevent water from contacting the finned tubes of the finned tube heat exchanger 15. Fans 41 are disposed around the upper periphery of the tower to improve the draft through the tower and to disperse any plume which might tend to appear.

The size and number of wet-dry cooling towers is varied depending on the size of the turbine and ambient air conditions.

The wet-dry cooling towers are considerably smaller than dry cooling towers and the exhausted air from the wet-dry cooling towers is below saturation therefor they either produce no plume or under extremely adverse weather conditions produce a plume which is considerably less dense and disperses more rapidly than a plume from wet cooling towers.

What is claimed is:

1. A combination wet-dry condensing system for exhaust steam of a steam turbine, said condensing system comprising:

heat exchange means having two heat exchange portions, each portion being effective to condense exhaust steam by transferring heat to a liquid coolant associated therewith, means for cooling one liquid coolant associated with said one heat exchange portion of said heat exchanger means by contacting said one liquid coolant with air to cause evaporative cooling thereof, said evaporative cooling means being disposed remotely from said heat exchange means, a liquid to air heat exchanger for cooling the other liquid coolant associated with the other heat exchange portion of said heat exchange means, said liquid to air heat exchanger being disposed remotely from said heat exchange means, said evaporative cooling means and said liquid to air heat exchanger being disposed to allow series air flow therethrough, and two liquid propelling means, one liquid propelling means being effective to circulate said one coolant from said evaporative cooling means through said one heat exchange portion of said heat exchanger means and the other liquid propelling means being effective to propel said other liquid coolant through said liquid to air heat exchanger, one heat exchange portion of the heat exchange means comprises a plurality of tubes extending therethrough, and so arranged with respect to the heat exchange means that the one coolant liquid flows therethrough, the other heat exchange portion of the heat exchange means comprises a plurality of tubes extending through the heat exchange means and so arranged with respect to the heat exchange means that the other coolant liquid flows therethrough, and said condensing system further comprises an influent conduit and an effluent conduit for the one liquid coolant flowing through the one heat exchange portion of the heat exchange means, an influent conduit and an effluent conduit for the other liquid flowing through the other heat exchange portion of the heat exchange means, flow control means associated with said influent conduits operable to allow influent coolant from each influent conduit to circulate through the respective heat exchange portions of the heat exchange means when set in one position and operable to shut off the influent coolant from the evaporative cooling means and allow influent coolant from the liquid to air heat exchanger to flow through both heat exchange portions of the heat exchange means when set in the other position, and flow control means associated with said effluent conduits operable to allow effluent coolant from the respective heat exchange portions of the heat exchange means to circulate through the evaporative cooling means and through the liquid to air heat exchanger, when set in one position, and operable to shut off the effluent conduit leading to the evaporative cooling means and allow effluent coolant from both heat exchange portions of the heat exchange means to circulate through the liquid to air heat exchanger, when set in another position.

* * * * *